(12) United States Patent
Tseng et al.

(10) Patent No.: US 11,747,011 B2
(45) Date of Patent: Sep. 5, 2023

(54) LIGHT EMITTING DEVICE AND HEADPHONE INCLUDING THE SAME

(71) Applicant: Cheng Uei Precision Industry Co., LTD., New Taipei (TW)

(72) Inventors: Chi-Ming Tseng, New Taipei (TW); Chin-Chung Lin, New Taipei (TW); Ming-Han Kuo, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/988,728

(22) Filed: Nov. 16, 2022

(65) Prior Publication Data

US 2023/0220988 A1 Jul. 13, 2023

(30) Foreign Application Priority Data

Jan. 10, 2022 (CN) .......................... 202220052360.6

(51) Int. Cl.
| | |
|---|---|
| *F21V 33/00* | (2006.01) |
| *H04R 1/10* | (2006.01) |
| *F21V 7/00* | (2006.01) |
| *F21V 5/00* | (2018.01) |
| *F21V 7/04* | (2006.01) |

(52) U.S. Cl.
CPC .......... *F21V 33/0056* (2013.01); *F21V 5/008* (2013.01); *F21V 7/0025* (2013.01); *F21V 7/04* (2013.01); *H04R 1/1008* (2013.01); *H04R 1/1091* (2013.01); *F21V 2200/00* (2015.01)

(58) Field of Classification Search
CPC .. F21V 33/0056; H04R 1/1008; H04R 1/1091
See application file for complete search history.

(56) References Cited

U.S. PATENT DOCUMENTS

| | | | |
|---|---|---|---|
| 7,377,666 B1* | 5/2008 | Tyler | A61F 11/14 362/311.06 |
| 9,717,633 B2* | 8/2017 | Waters | A41D 13/0002 |
| 9,803,852 B1* | 10/2017 | Clacken | H04R 1/1058 |
| 2018/0356582 A1* | 12/2018 | Sousek | F21S 43/243 |
| 2021/0310633 A1* | 10/2021 | Wolak-Gorczyca | F21S 43/315 |

* cited by examiner

*Primary Examiner* — Zheng Song
(74) *Attorney, Agent, or Firm* — Cheng-Ju Chiang (57) ABSTRACT

A headphone includes a housing, a light emitting device and a printed circuit board. The light emitting device is mounted in the housing. The light emitting device includes a luminous unit, and a light guiding unit disposed close to the luminous unit. The light guiding unit has a base portion, an incident surface formed at an inner surface of an inner end of the base portion, an emitting surface formed at an outer surface of an outer end of the base portion, a first refracting surface, a first reflecting surface, a second reflecting surface, a second refracting surface, a light transmitting column, a positioning wall, an upper buckling arm and a lower buckling arm. The printed circuit board is mounted in the housing.

19 Claims, 11 Drawing Sheets

LIGHT EMITTING DEVICE AND HEADPHONE INCLUDING THE SAME

CROSS-REFERENCE TO RELATED APPLICATION

The present application is based on, and claims priority from, China Patent Application No. 202220052360.6, filed Jan. 10, 2022, the disclosure of which is hereby incorporated by reference herein in its entirety.

BACKGROUND OF THE INVENTION

1. Field of the Invention

The present invention generally relates to a light emitting device, and more particularly to a light emitting device which improves a usage rate of a light source and simplifies an assembly process of the light emitting device, and a headphone including the light emitting device.

2. The Related Art

Figure 10:
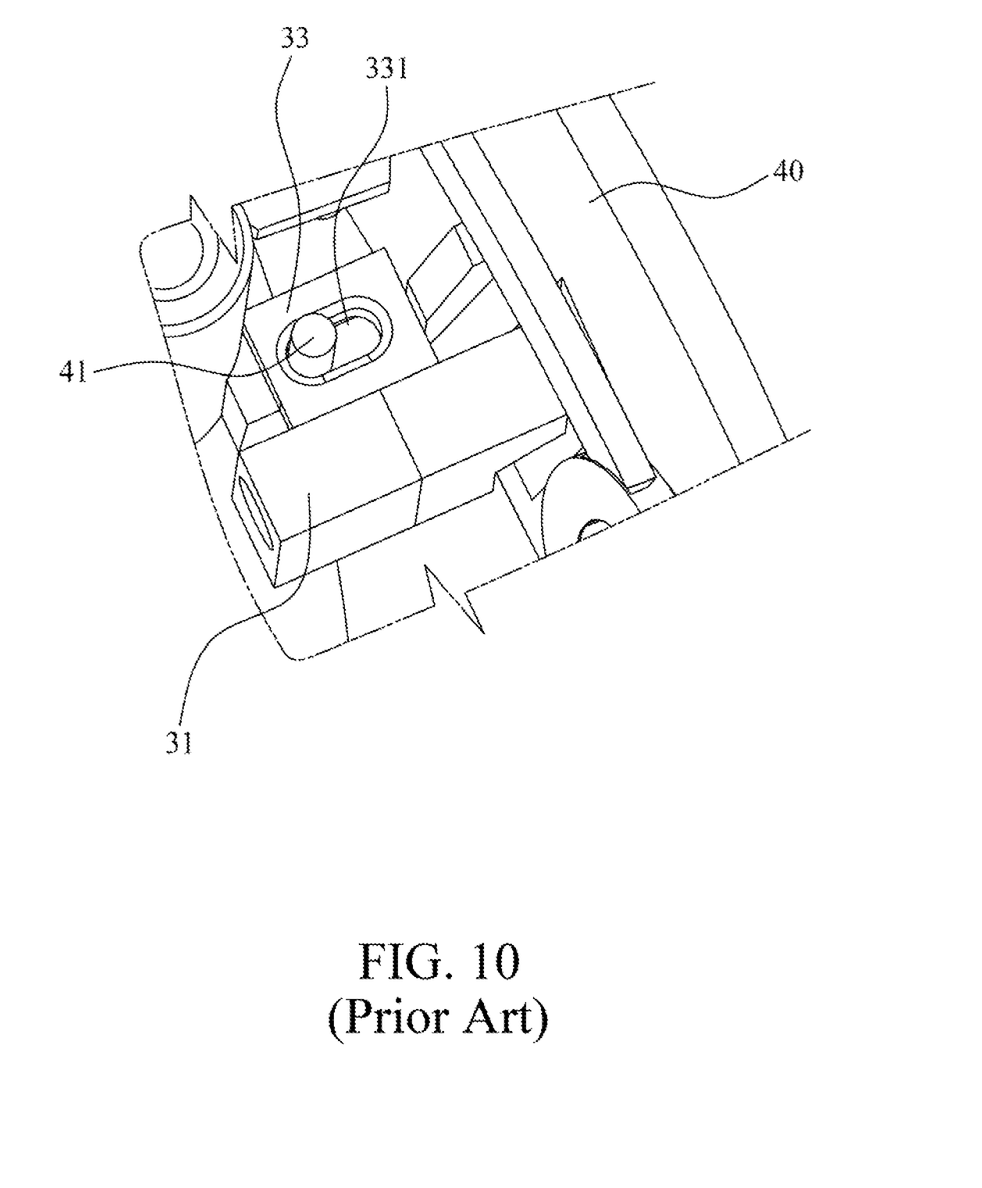
FIG. 10 is a partial perspective view of a headphone in prior art, wherein a light guiding unit is fastened to a housing of the headphone.
Figure 11:
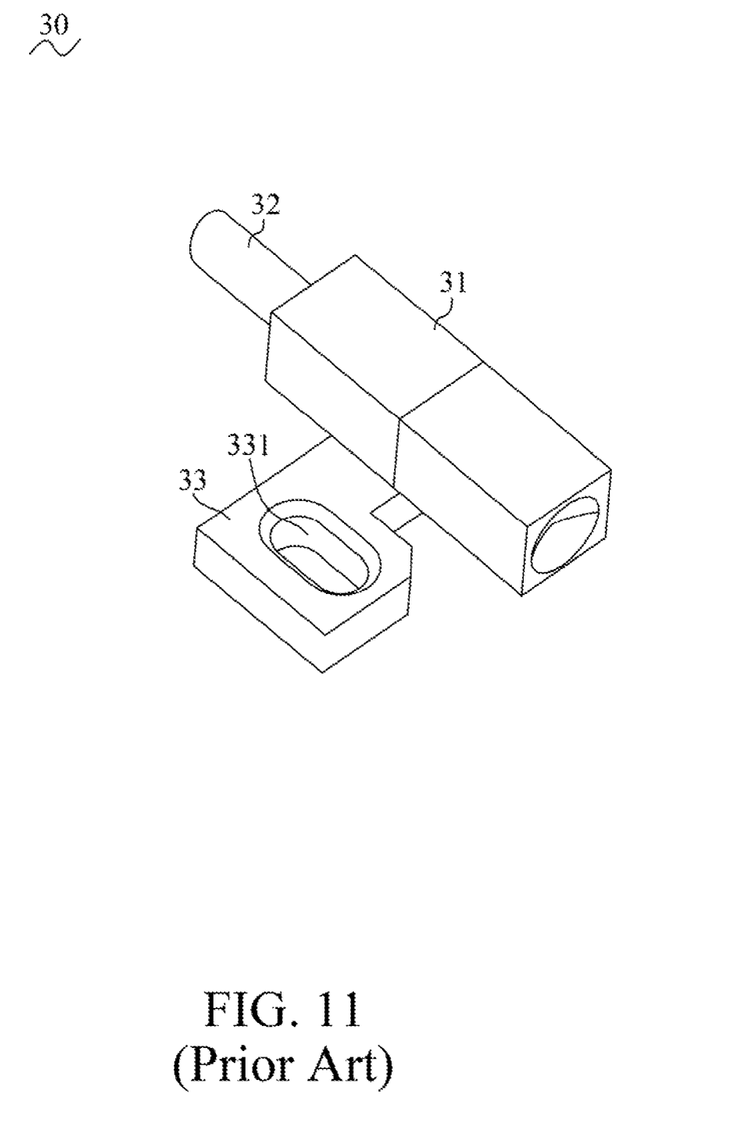
FIG. 11 is a perspective view of the light guiding unit of the headphone of FIG. 10.

Referring to FIG. 10 and FIG. 11, a conventional headphone includes a housing 40, and a light emitting device assembled in the housing 40. When a user uses the conventional headphone, the user identifies whether the conventional headphone is normally powered on by the light emitting device. The light emitting device usually includes a LED (Light-Emitting Diode) lamp, and a light guiding unit 30. The light guiding unit 30 includes a light guiding element 31, a light transmitting column 32 mounted at one end of the light guiding element 31, and a fixing section 33 arranged at one side surface of the light guiding element 31. The light guiding element 31 is formed in a rectangular shape. The LED lamp and the light transmitting column 32 are disposed opposite to each other. Nonetheless, partial light rays emitted from the LED lamp are unable to be refracted to the light transmitting column 32, consequently, a usage rate of a light source is lowered.

The fixing section 33 has a through hole 331 which penetrates an upper surface and a lower surface of the fixing section 33. The conventional headphone further includes a hot-melt column 41 assembled in the housing 40. The light guiding element 31 is fastened in the housing 40 by means of inserting the hot-melt column 41 into the through hole 331, then heat the hot-melt column 41 with a heating tip of a hot-melt tool, and the hot-melt column 41 is pressed, the hot-melt column 41 is fastened to the fixing section 33, so that the light guiding element 31 is fastened in the housing 40. However, a cost of the hot-melt tool is higher, the housing 40 is frequently scratched to be defective at the time of the conventional headphone being placed to the hot-melt tool, and if the hot-melt column 41 is skewed, the light guiding unit 30 is unable to be fixed to the fixing section 33 properly, the conventional headphone is unable to be reworked to be scrapped, so a manufacturing cost of the conventional headphone is increased.

Therefore, it is especially important to provide a light emitting device, and a headphone including the light emitting device, the light emitting device improves a usage rate of a light source and simplifies an assembly process of the light emitting device.

SUMMARY OF THE INVENTION

An object of the present invention is to provide a light emitting device improving a usage rate of a light source and simplifies an assembly process of the light emitting device. The light emitting device includes a luminous unit, and a light guiding unit disposed close to the luminous unit. Light emitted by the luminous unit travels along a light axis of the luminous unit. The light guiding unit has an incident surface formed at an inner surface of an inner end of the light guiding unit, an emitting surface formed at an outer surface of an outer end of the light guiding unit, a first refracting surface, a first reflecting surface, a second reflecting surface, a second refracting surface and a light transmitting column. The incident surface is adjacent to the luminous unit. The incident surface faces the luminous unit. The emitting surface of the outer end of the light guiding unit and the incident surface of the inner end of the light guiding unit are opposite to each other. The incident surface is located between the luminous unit and the emitting surface. The first refracting surface is disposed in the light axis. The first refracting surface is slantwise extended rearward and inward from a rear edge of the emitting surface. The first reflecting surface is parallel to the light axis, and the first reflecting surface is connected to the emitting surface. The first reflecting surface is extended horizontally and extended inward from a front edge of the emitting surface. The second reflecting surface is parallel to the light axis and is connected to the first refracting surface. The second reflecting surface is extended inward from a rear edge of the first refracting surface. The second reflecting surface is parallel to the first reflecting surface. The second reflecting surface is located between the incident surface and the first refracting surface. The second refracting surface is connected between the incident surface and the first reflecting surface. The second refracting surface is slantwise extended frontward and outward from a front of the incident surface. The second refracting surface is connected with the first reflecting surface. The light transmitting column is protruded outward from a middle of the emitting surface. A middle of the inner surface of the inner end of the light guiding unit is recessed inward to form the incident surface. The incident surface is an optical cambered surface. The first reflecting surface and the second reflecting surface are longitudinally positioned at two opposite positions of the light guiding unit. The incident surface, the emitting surface, the first refracting surface, the first reflecting surface, the second reflecting surface and the second refracting surface are all perpendicular to a central symmetry plane of the light guiding unit. The central symmetry plane is defined by a transverse axis and a longitudinal axis. The transverse axis is parallel with the light axis. The longitudinal axis is parallel with the emitting surface.

Another object of the present invention is to provide a light emitting device. The light emitting device includes a luminous unit, and a light guiding unit disposed close to the luminous unit. The light guiding unit has a base portion. The base portion has an incident surface positioned at one end of the light axis, a first refracting surface, an emitting surface, a second refracting surface, a first reflecting surface, a second reflecting surface, a second refracting surface, a light transmitting column, a positioning wall and a pair of buckling arms. The first refracting surface is positioned at the other end of the light axis. The incident surface is positioned between the luminous unit and the first refracting surface. The emitting surface is connected with the first refracting surface. The second refracting surface is connected with one side of the incident surface. The first reflecting surface is interconnected with the emitting surface and the second refracting surface. The second reflecting surface is connected with the other side of the incident surface. The second reflecting surface is interconnected with the incident surface and the first refracting surface. The light transmitting column is protruded outward from a middle of the emitting surface. The positioning wall is extended from the second reflecting surface of the base portion. The pair of buckling arms are extended from two opposite surfaces of the base portion. The two opposite surfaces of the base portion are two surfaces of the base portion excluding the incident surface, the first refracting surface, the emitting surface, the second refracting surface, the first reflecting surface and the second reflecting surface. Each buckling arm is a cantilever.

Another object of the present invention is to provide a headphone. The headphone includes a housing, a printed circuit board and a light emitting device. The housing has an opening, a pair of restricting blocks, a supporting section and a limiting block. The opening penetrates through a periphery of the housing. The pair of the restricting blocks are positioned at an inside of the housing and are near to the opening. The supporting section is connected between the pair of the restricting blocks. The limiting block is surrounded among the pair of the restricting blocks and the supporting section. The printed circuit board is mounted in the housing. The light emitting device is mounted in the housing. The light emitting device has a luminous unit, a light guiding unit, a light transmitting column, a positioning wall and a pair of buckling arms. The luminous unit defines a light axis. The light guiding unit is disposed close to the luminous unit. The light guiding unit has a base portion, a light transmitting column, a positioning wall and a pair of buckling arms. The base portion has an incident surface positioned at one end of the light axis, a first refracting surface positioned at the other end of the light axis, an emitting surface connected with the first refracting surface, a second refracting surface connected with one side of the incident surface, a first reflecting surface interconnected with the emitting surface and the second refracting surface, a second reflecting surface connected with the other side of the incident surface, a light transmitting column protruded from the emitting surface, a positioning wall extended from the second reflecting surface of the base portion and a pair of buckling arms extended from two opposite surfaces of the base portion. The incident surface is positioned between the luminous unit and the first refracting surface. The second reflecting surface is interconnected with the incident surface and the first refracting surface. The two opposite surfaces are two surfaces of the base portion excluding the incident surface, the first refracting surface, the emitting surface, the second refracting surface, the first reflecting surface and the second reflecting surface. Each buckling arm is a cantilever. The second reflecting surface is connected with the limiting block and the supporting section. The light transmitting column is inserted in the opening. The positioning wall is engaged with the limiting block. The pair of the buckling arms are engaged with the pair of the restricting blocks. The luminous unit is mounted on the printed circuit board. The base portion is positioned between the pair of the buckling arms.

As described above, the light guiding unit of the light emitting device is disposed as the up-down symmetrical polyhedron, the incident surface, the emitting surface, the first refracting surface, the first reflecting surface, the second reflecting surface and the second refracting surface are all perpendicular to the central symmetry plane of the light guiding unit, and light rays emitted by the luminous unit are effectively guided to the outermost surface of the light transmitting column by virtue of refracting actions of the first refracting surface and the second refracting surface, and reflecting actions of the first reflecting surface and the second reflecting surface, so light transmission rates of the light rays of the light guiding unit are increased. Furthermore, the light guiding unit has the upper buckling arm, the lower buckling arm and the positioning wall, the inside of the housing includes the upper restricting block fastened with the upper buckling arm, the lower restricting block fastened with the lower buckling arm, and the limiting block fastened in the positioning wall, so an assembly operator is able to assemble the light guiding unit to the inside of the housing without tools, an assembly cost of the headphone is lowered, and working hours of the headphone are shortened, in that case, a reworking performance of assembling the light guiding unit in the inside of the housing of the headphone is improved. As a result, the light emitting device improves a usage rate of a light source and simplifies an assembly process of the light emitting device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Referring to FIG. 1, FIG. 2, FIG. 3 and FIG. 6, a light emitting device 20, and a headphone 100 including the light emitting device 20 in accordance with a preferred embodiment of the present invention are shown. The headphone 100 includes an earcup 10, a printed circuit board (PCB) 13, a loudspeaker unit 14 and the light emitting device 20.

Figure 1:
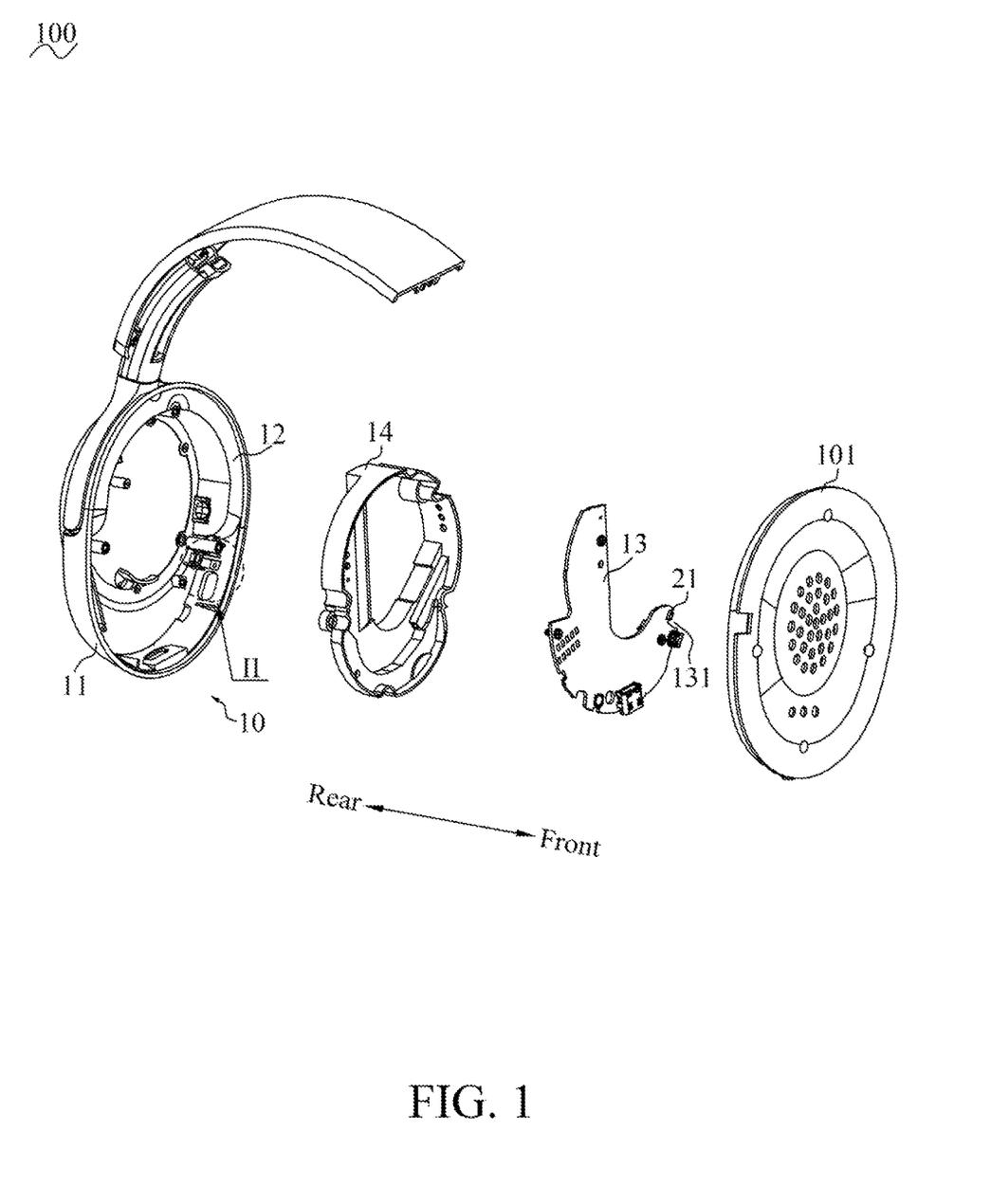
FIG. 1 is an exploded view of a headphone in accordance with a preferred embodiment of the present invention.
Figure 2:
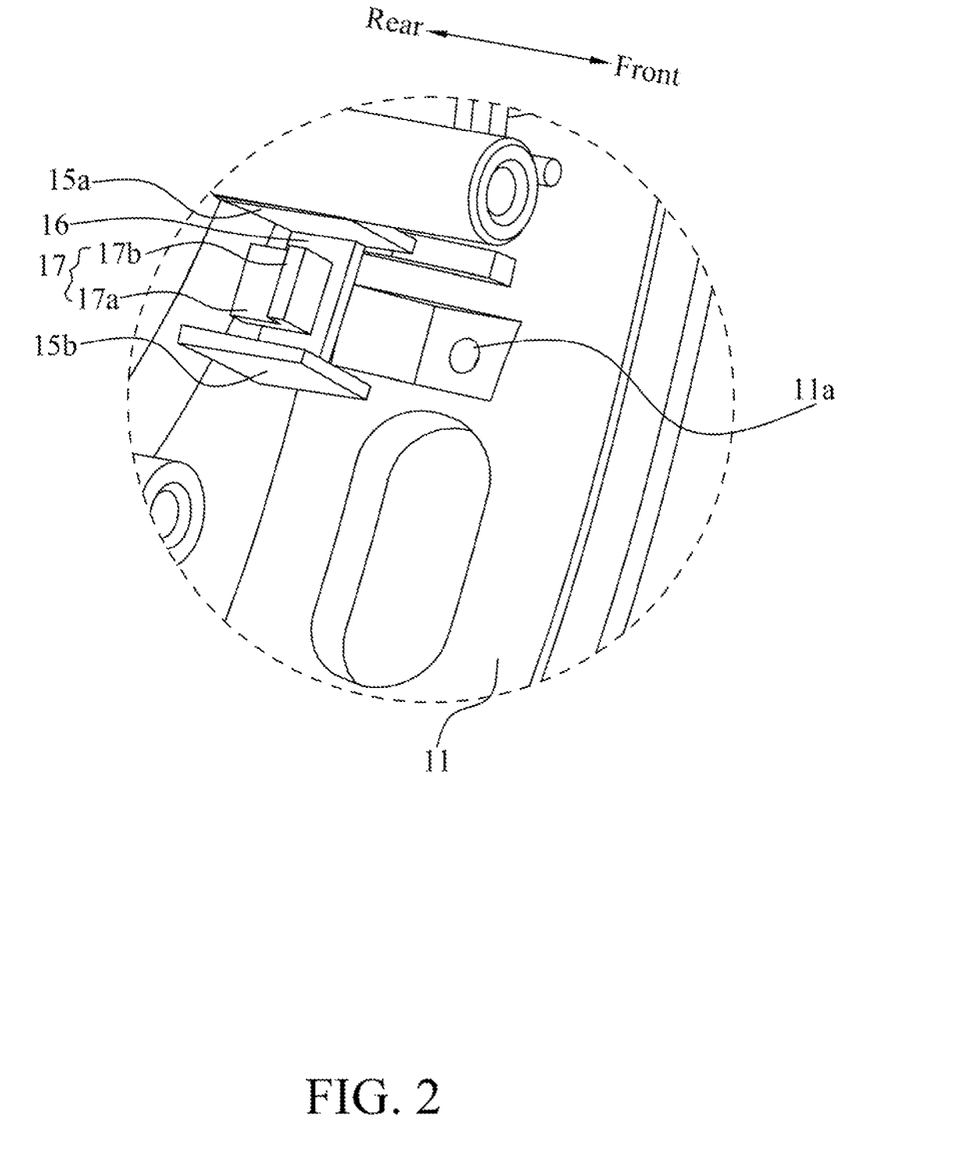
FIG. 2 is an enlarged view of an encircled portion II of the headphone of FIG. 1.
Figure 3:
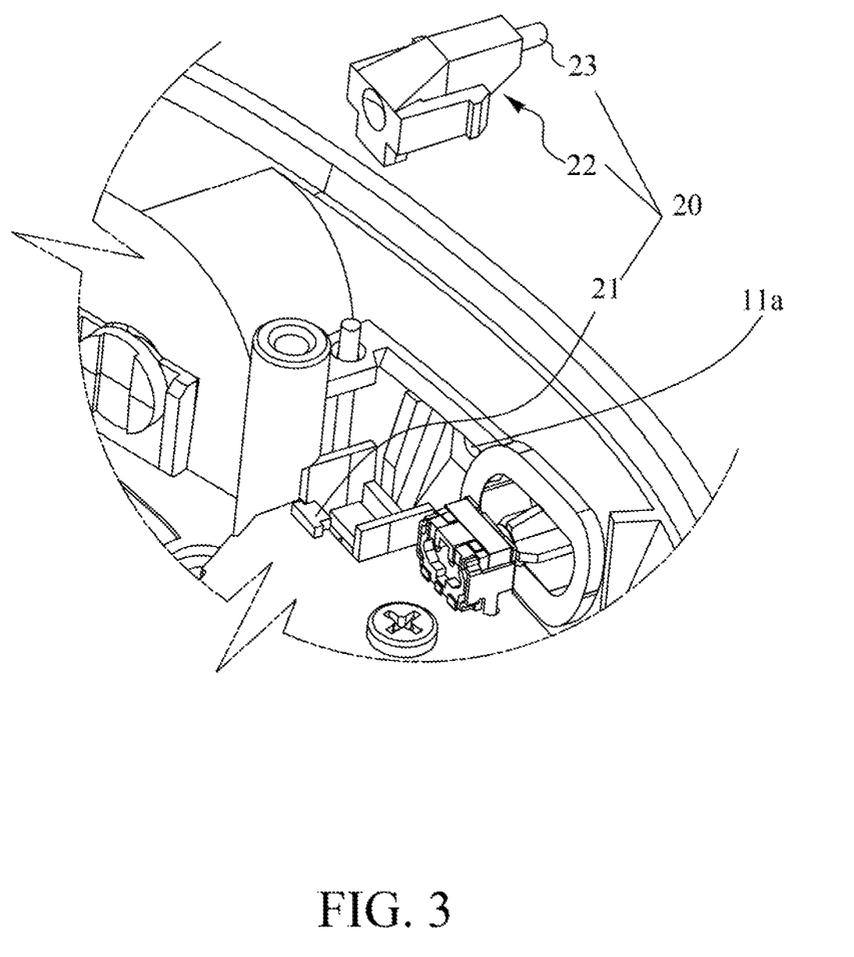
FIG. 3 is a partial perspective view of the headphone of FIG. 1.

The earcup 10 includes a housing 11 and a cover 101. The housing 11 has an opening 11a penetrating through an inner surface and an outer surface of the housing 11. A periphery of the housing 11 of the headphone 100 defines the opening 11a penetrating through an inner surface and an outer surface of the periphery of the housing 11. The earcup 10 has an audio chamber 12 formed inside the earcup 10. The printed circuit board 13 is mounted in the audio chamber 12 of the housing 11. The loudspeaker unit 14 is mounted in the audio chamber 12, and the loudspeaker unit 14 is electrically connected to the printed circuit board 13. The cover 101 is covered to the housing 11. The cover 101, the printed circuit board 13, the loudspeaker unit 14 and the housing 11 are assembled along a front-to-rear direction.

The light emitting device 20 is mounted in the housing 11. The light emitting device 20 includes a luminous unit 21, a light guiding unit 22 and a light transmitting column 23. The luminous unit 21 is mounted to the printed circuit board 13. The luminous unit 21 is electrically connected to the printed circuit board 13. The luminous unit 21 is disposed adjacent to the opening 11a. The luminous unit 21 defines a light axis 21a. Light emitted by the luminous unit 21 travels along the light axis 21a of the luminous unit 21. The light guiding unit 22 is mounted between the luminous unit 21 and the opening 11a. The light transmitting column 23 is arranged at an outer end of the light guiding unit 22. The light guiding unit 22 is disposed close to the luminous unit 21. The light guiding unit 22 is next to the opening 11a. The light transmitting column 23 is inserted in the opening 11a. The outermost surface 231 of the light transmitting column 23 is smoothly connected with the outer surface of the housing 11. The outermost surface 231 of the light transmitting column 23 is smoothly connected with the outer surface of the periphery of the housing 11.

Referring to FIG. 1 to FIG. 6, in order to describe a structure of the light guiding unit 22 more conveniently, a transverse axis is defined as a X axis, and the X axis is defined to be parallel to the light axis 21a. A longitudinal axis is defined as a Y axis, and the Y axis is defined to be perpendicular to the X axis. The light guiding unit 22 is formed as an up-down symmetrical polyhedron. A X-Y plane is defined as a central symmetry plane. One end of the light guiding unit 22 which is adjacent to the luminous unit 21 is defined as an inner end of the light guiding unit 22, and the other end of the light guiding unit 22 which is adjacent to the opening 11a is defined as the outer end of the light guiding unit 22. The central symmetry plane is defined by the transverse axis and the longitudinal axis. The central symmetry plane is defined by the X axis and the Y axis. The X axis is parallel with the light axis 21a. The Y axis is parallel with an emitting surface 224 of the light guiding unit 22. The transverse axis is parallel with the light axis. The longitudinal axis is parallel with the emitting surface 224.

Referring to FIG. 4 to FIG. 8, in the preferred embodiment, in order to ensure the light emitted by the luminous unit 21 to evenly penetrate through the light transmitting column 23, and further increase a light transmittance of the light transmitting column 23. The light guiding unit 22 has an incident surface 221 facing the luminous unit 21, and the emitting surface 224 opposite to the incident surface 221. The incident surface 221 is formed at an inner surface of the inner end of the light guiding unit 22. A middle of the inner surface of the inner end of the light guiding unit 22 is recessed inward to form the incident surface 221. The incident surface 221 is an optical cambered surface. The incident surface 221 is adjacent to the luminous unit 21. The emitting surface 224 is formed at an outer surface of the outer end of the light guiding unit 22. The emitting surface 224 of the outer end of the light guiding unit 22 and the incident surface 221 of the inner end of the light guiding unit 22 are opposite to each other along the X axis of the light guiding unit 22. The incident surface 221 is located between the luminous unit 21 and the emitting surface 224. The light transmitting column 23 is protruded outward from a middle of the emitting surface 224.

Figure 4:
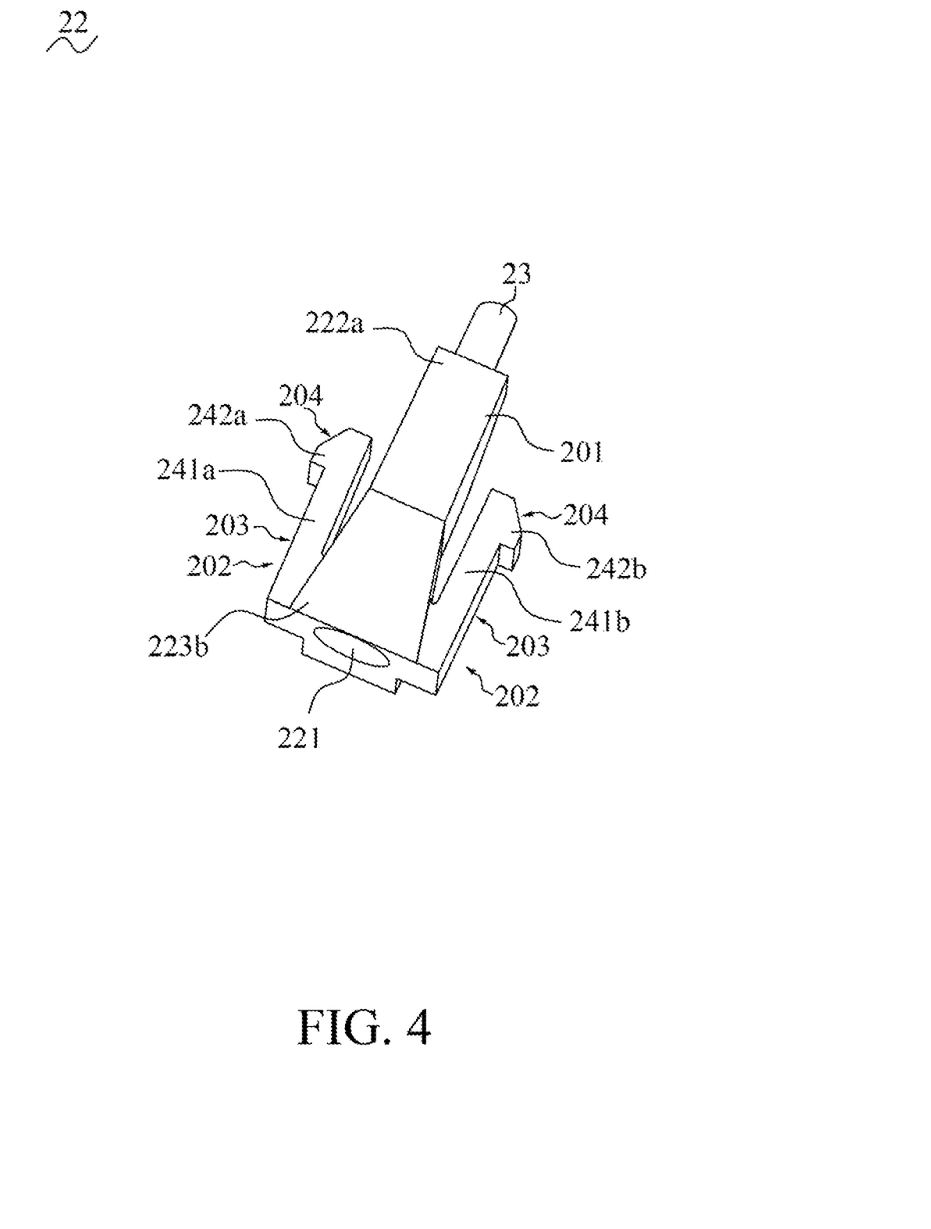
FIG. 4 is a perspective view of a light guiding unit of the headphone of FIG. 1.
Figure 5:
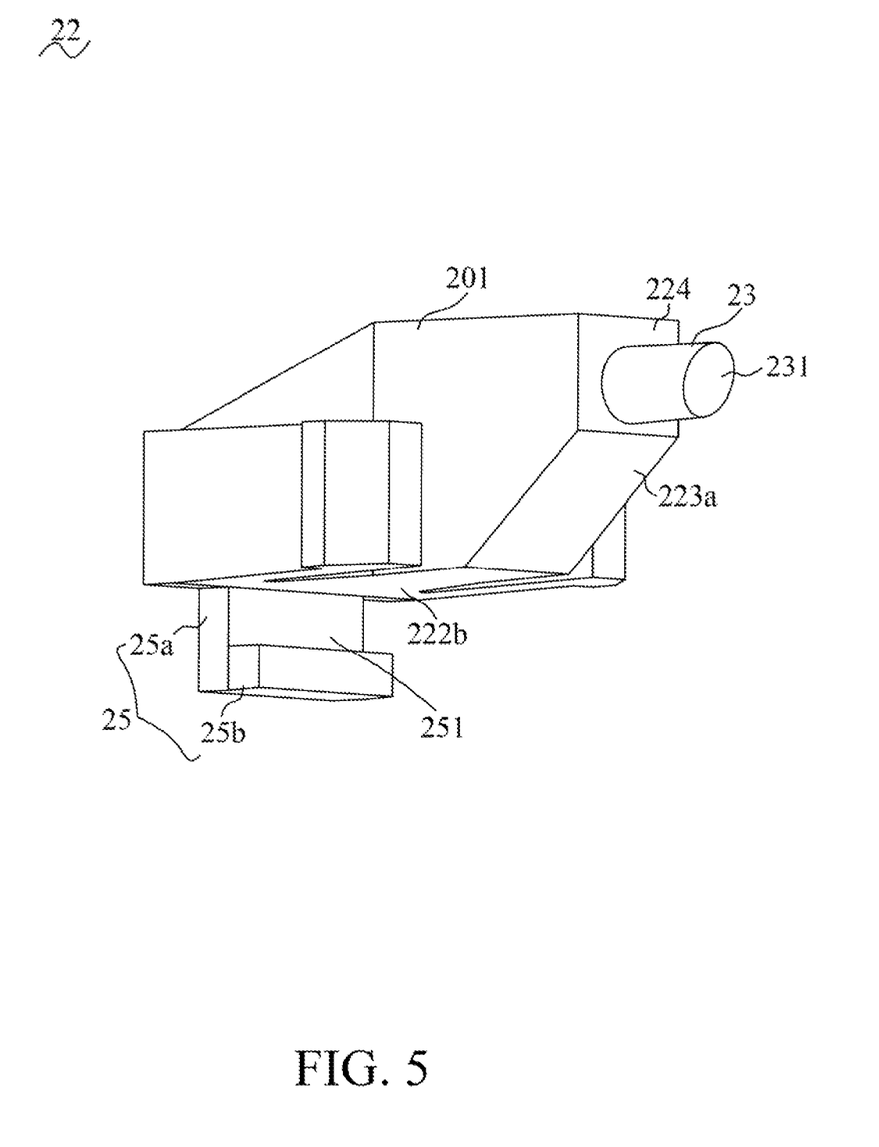
FIG. 5 is another perspective view of the light guiding unit of the headphone of FIG. 1.
Figure 6:
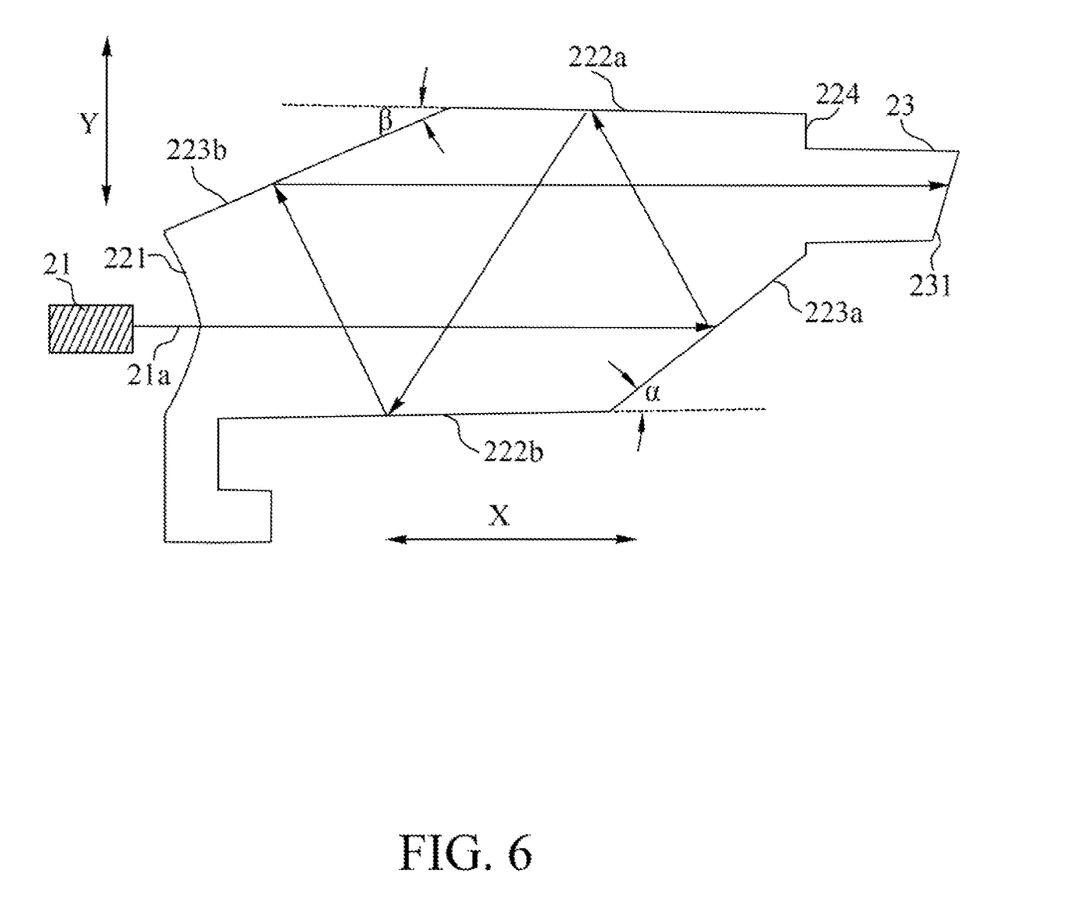
FIG. 6 is a schematic diagram that shows a light path of a light emitting device of the headphone of FIG. 1.

The light guiding unit 22 has a first refracting surface 223a disposed in a light path of the light axis 21a. The incident surface 221 is disposed in the light path of the light axis 21a. The incident surface 221 is positioned at one end of the light axis 21a. The first refracting surface 223a is positioned at the other end of the light axis 21a. The incident surface 221 is positioned between the luminous unit 21 and the first refracting surface 223a. The emitting surface 224 is connected with the first refracting surface 223a. A second refracting surface 223b is connected with one side of the incident surface 221. The first refracting surface 223a is slantwise extended rearward and inward from a rear edge of the emitting surface 224. The light guiding unit 22 has a first reflecting surface 222a parallel to the light axis 21a, and the first reflecting surface 222a is connected to a front edge of the emitting surface 224. The first reflecting surface 222a is extended horizontally and extended inward from the front edge of the emitting surface 224. The first reflecting surface 222a is interconnected with the emitting surface 224 and the second refracting surface 223b. The first reflecting surface 222a extends along a horizontal direction of the light path of the light axis 21a. The light guiding unit 22 has a second reflecting surface 222b parallel to the light axis 21a and connected to the first refracting surface 223a.

The second reflecting surface 222b is connected with the other side of the incident surface 221. The second reflecting surface 222b is interconnected with the incident surface 221 and the first refracting surface 223a. The second reflecting surface 222b is extended inward from a rear edge of the first refracting surface 223a. The second reflecting surface 222b extends along the horizontal direction of the light path of the light axis 21a. The second reflecting surface 222b is parallel to the first reflecting surface 222a. The first reflecting surface 222a and the second reflecting surface 222b are longitudinally positioned at two opposite positions of the light guiding unit 22 along the Y axis. The second reflecting surface 222b is located between the incident surface 221 and the first refracting surface 223a. The light guiding unit 22 has the second refracting surface 223b connected between the incident surface 221 and the first reflecting surface 222a. The second refracting surface 223b is slantwise extended frontward and outward from a front of the incident surface 221. The second refracting surface 223b is connected with the first reflecting surface 222a.

The light transmitting column 23 is provided on the emitting surface 224. The first refracting surface 223a is connected between the second reflecting surface 222b and the emitting surface 224. The incident surface 221, the emitting surface 224, the first refracting surface 223a, the first reflecting surface 222a, the second reflecting surface 222b and the second refracting surface 223b are all perpendicular to the central symmetry plane of the light guiding unit 22.

Specifically, the first refracting surface 223a is intersected with an extension line of the second reflecting surface 222b, so an angle α is formed between the first refracting surface 223a and the extension line of the second reflecting surface 222b. The angle α which is formed between the first refracting surface 223a and the extension line of the second reflecting surface 222b is ranged from more than thirty-seven degrees to less than forty degrees. The second refracting surface 223b is intersected with an extension line of the first reflecting surface 222a, so an angle β is formed between the second refracting surface 223b and the extension line of the first reflecting surface 222a. The angle β which is formed between the second refracting surface 223b and the extension line of the first reflecting surface 222a is ranged from more than twenty-five degrees to less than twenty-eight degrees.

Referring to FIG. 4 to FIG. 6, light rays which are emitted from the luminous unit 21 enter the light guiding unit 22 through the incident surface 221, most of the light rays are intersected with the first refracting surface 223a along the light path of the light axis 21a. The angle α is formed between the first refracting surface 223a and the extension line of the second reflecting surface 222b, so the light rays are refracted by the first refracting surface 223a to the first reflecting surface 222a. Then the light rays which are refracted by the first refracting surface 223a are reflected to the second reflecting surface 222b by a reflecting action of the first reflecting surface 222a. When the light rays which are reflected to the second reflecting surface 222b pass the second reflecting surface 222b, and then the light rays which are reflected to the second reflecting surface 222b are reflected to the second refracting surface 223b by a reflecting action of the second reflecting surface 222b. The angle β is formed between the second refracting surface 223b and the extension line of the first reflecting surface 222a, the light rays are refracted to the light transmitting column 23 by the second refracting surface 223b, in the meanwhile, all surfaces of the light guiding unit 22 are polished to increase light transmission rates of the light rays of the light guiding unit 22, and the polished surfaces of the light guiding unit 22 make the light rays enter the light guiding unit 22.

Besides, when a small part of the light rays which are emitted by the luminous unit 21 is refracted to the first reflecting surface 222a by the incident surface 221, and then the small part of the light rays which is refracted to the first reflecting surface 222a is reflected to the second reflecting surface 222b by the reflecting action of the first reflecting surface 222a, and then the small part of the light rays which is reflected to the second reflecting surface 222b is reflected to the second refracting surface 223b by the reflecting action of the second reflecting surface 222b, and in the end, the small part of the light rays which is reflected to the second refracting surface 223b is refracted to the light transmitting column 23 by the second refracting surface 223b, and the small part of the light rays which is reflected to the second refracting surface 223b is guided to a surface of the light transmitting column 23. The light rays enter the light guiding unit 22 from the incident surface 221 which is the optical cambered surface, the light rays are guided to the outermost surface 231 of the light transmitting column 23 by a refraction and a reflection of an outline of the light guiding unit 22. The outermost surface 231 of the light transmitting column 23 is a circular inclination surface. The outermost surface 231 of the light transmitting column 23 is gradually inclined inward from front to rear.

In a similar way, the small part of the light rays which is emitted by the luminous unit 21 is refracted to the second reflecting surface 222b by the incident surface 221, and then the small part of the light rays which is refracted to the second reflecting surface 222b is reflected to the second refracting surface 223b by the reflecting action of the second reflecting surface 222b, and in the end, the small part of the light rays which is reflected to the second refracting surface 223b is refracted to the light transmitting column 23 by the second refracting surface 223b, and the small part of the light rays which is reflected to the second refracting surface 223b is guided to the light transmitting column 23 to increase the light transmission rates of the light rays of the light guiding unit 22.

Simultaneously, in the preferred embodiment, the light guiding unit 22 and the light transmitting column 23 are integrally formed. The light guiding unit 22 and the light transmitting column 23 are made of a polycarbonate material into which a certain proportion of light diffusing agents and titanium dioxides are added. In the light diffusing agents and the titanium dioxides, a proportion range of the titanium dioxides is above zero point eighteen thousandths (0.18‰) and below zero point twenty-five thousandths (0.25‰), and a proportion range of the light diffusing agents is above two thousandths (2‰) and below two point two thousandths (2.2‰), so in a refraction process of the light rays, the light rays are evenly diffused, and the light rays are guided to the surface of the light transmitting column 23. The light rays are guided to the outermost surface of the light transmitting column 23.

Referring to FIG. 1 to FIG. 9, in the preferred embodiment, in order to further assemble and fasten the light guiding unit 22 in the audio chamber 12, the light guiding unit 22 has a base portion 201 and a pair of buckling arms 202. The pair of the buckling arms 202 include an upper buckling arm 24a protruded upward and extended outward from an upper surface of an inner end of the base portion 201, and a lower buckling arm 24b protruded downward and extended outward from a lower surface of the inner end of the base portion 201. The pair of the buckling arms 202 are extended from two opposite surfaces of the base portion 201. The two opposite surfaces of the base portion 201 are two surfaces of the base portion 201 excluding the incident surface 221, the first refracting surface 223a, the emitting surface 224, the second refracting surface 223b, the first reflecting surface 222a and the second reflecting surface 222b. Each buckling arm 202 is a cantilever. The pair of the buckling arms 202 have two elastic arms 203 and two hooks 204. Two inner ends of the two opposite surfaces of the base portion 201 protrude oppositely and extend outward to form the two elastic arms 203. Tail ends of the two elastic arms 203 protrude towards a pair of restricting blocks 103 of the housing 11 to form the two hooks 204. The two elastic arms 203 of the pair of the buckling arms 202 abut against two facing surfaces of the pair of the restricting blocks 103. The hooks 204 of the pair of the buckling arms 202 hook two outer surfaces of the pair of the restricting blocks 103.

The upper buckling arm 24a and the lower buckling arm 24b are formed at the upper surface and the lower surface of the inner end of the base portion 201 of the light guiding unit 22. The upper buckling arm 24a has an upper elastic arm 241a and an upper hook 242a. The lower buckling arm 24b has a lower elastic arm 241b and a lower hook 242b. The upper surface and the lower surface of the inner end of the base portion 201 protrude oppositely and extend outward to form the upper elastic arm 241a and the lower elastic arm 241b. A top of a tail end of the upper elastic arm 241a protrudes upward to form the upper hook 242a. A bottom of a tail end of the lower elastic arm 241b protrudes downward to form the lower hook 242b. A surface of the upper buckling arm 24a facing towards the base portion 201 is parallel to a surface of the lower buckling arm 24b facing towards the base portion 201.

The base portion 201 has the incident surface 221, the emitting surface 224, the first refracting surface 223a, the first reflecting surface 222a, the second reflecting surface 222b and the second refracting surface 223b. The incident surface 221 is formed at an inner surface of the inner end of the base portion 201 of the light guiding unit 22. The emitting surface 224 is formed at an outer surface of an outer end of the base portion 201 of the light guiding unit 22. The emitting surface 224 of the outer end of the base portion 201 and the incident surface 221 of the inner end of the base portion 201 are opposite to each other along the X axis. A middle of the inner surface of the inner end of the base portion 201 of the light guiding unit 22 is recessed inward to form the incident surface 221. The first reflecting surface 222a and the second reflecting surface 222b are positioned at two opposite positions of the base portion 201 of the light guiding unit 22.

A rear of the inner end of the light guiding unit 22 extends rearward and then extends outward to form a positioning wall 25. A rear of the inner end of the base portion 201 of the light guiding unit 22 extends rearward and then extends outward to form the positioning wall 25. The incident surface 221 is located in front of the positioning wall 25. The positioning wall 25 is extended from the second reflecting surface 222b of the base portion 201. The positioning wall 25 is arranged at an inner end of the second reflecting surface 222b. The positioning wall 25 has a first positioning block 25a extended rearward from the inner end of the second reflecting surface 222b, and a second positioning block 25b protruded outward from a tail end of the first positioning block 25a. The first positioning block 25a of the positioning wall 25 is perpendicularly connected to the inner end of the second reflecting surface 222b of the light guiding unit 22. The second positioning block 25b extends towards an extending direction of the opening 11a to make the positioning wall 25 formed in a L shape. A front of an outer end of the positioning wall 25 defines a limiting space 251 which is defined between the first positioning block 25a and the second positioning block 25b. The limiting space 251 of the positioning wall 25 faces outward and towards the extending direction of the opening 11a. The limiting space 251 is located at the inner end of the second reflecting surface 222b.

Figure 7:
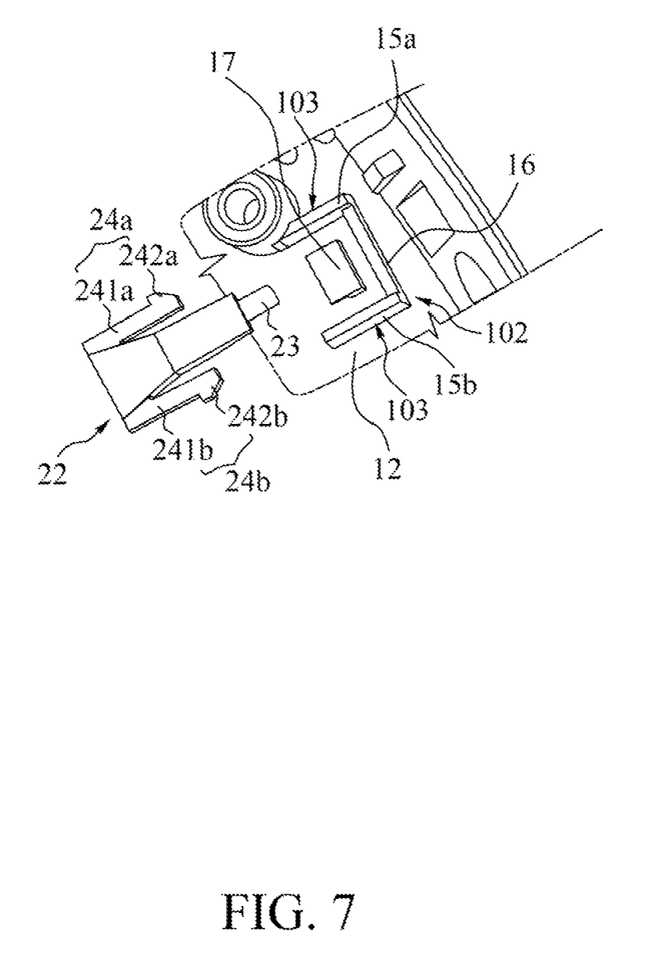
FIG. 7 is a partially exploded view of the headphone, wherein the light guiding unit is unlocked from a locking unit of a housing of the headphone of FIG. 1.
Figure 8:
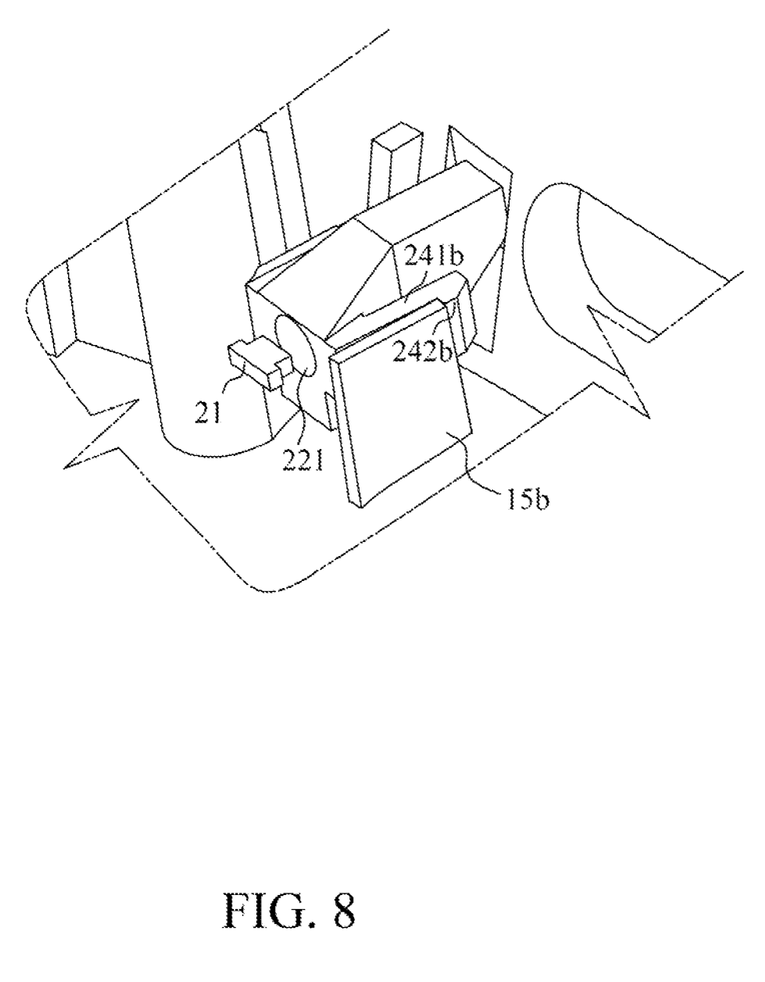
FIG. 8 is a partial assembling view of the headphone, wherein the light guiding unit is locked to the locking unit of the housing of the headphone of FIG. 1.

An inside of the housing 11 has the pair of the restricting blocks 103. The pair of the restricting blocks 103 are positioned at the inside of the housing 11 and are near to the opening 11a. The inside of the housing 11 includes an upper restricting block 15a near to a top of the opening 11a, a lower restricting block 15b near to a bottom of the opening 11a, a supporting section 16 connected between the upper restricting block 15a and the lower restricting block 15b, and a limiting block 17 surrounded among the upper restricting block 15a, the lower restricting block 15b and the supporting section 16. The supporting section 16 is connected between the pair of the restricting blocks 103. The limiting block 17 is surrounded among the pair of the restricting blocks 103 and the supporting section 16. The upper restricting block 15a, the lower restricting block 15b, the supporting section 16 and the limiting block 17 are disposed at an inner surface of the housing 11. The upper restricting block 15a, the lower restricting block 15b, the supporting section 16 and the limiting block 17 together form a locking unit 102. The printed circuit board 13 further has a cutting portion 131 formed at an edge of the printed circuit board 13. The lower restricting block 15b, the supporting section 16 and the limiting block 17 of the locking unit 102 is positioned in the cutting portion 131 of the printed circuit board 13. The second reflecting surface 222b is connected with the limiting block 17 and the supporting section 16. The light transmitting column 23 is inserted in the opening 11a. The positioning wall 25 is engaged with the limiting block 17. The pair of the buckling arms 202 are engaged with the pair of the restricting blocks 103. The luminous unit 21 is mounted on the printed circuit board 13. The base portion 201 is positioned between the pair of the buckling arms 202.

The pair of the restricting blocks 103 are rectangular. The pair of the restricting blocks 103 extend along an inside-to-outside direction. The opening 11a is extended along the inside-to-outside direction. The supporting section 16 is perpendicular to the pair of the restricting blocks 103. Two opposite ends of the supporting section 16 are connected to two outer ends of the pair of the restricting blocks 103 to form a U-shape structure. The limiting block 17 is mounted in the U-shape structure. The upper restricting block 15a is matched with the upper buckling arm 24a. The lower restricting block 15b is matched with the lower buckling arm 24b. The limiting block 17 is matched with the positioning wall 25. The limiting block 17 has a first limiting block 17a and a second limiting block 17b. The first limiting block 17a is protruded frontward from the inner surface of the housing 11. The first limiting block 17a is connected with the inner surface of the housing 11 along the front-to-rear direction. The second limiting block 17b is connected with the tail end of the first limiting block 17a, the second limiting block 17b is perpendicular to the first limiting block 17a, and the second limiting block 17b extends inward and towards the luminous unit 21, so that the limiting block 17 is shown in a lying L shape. A mouth of the limiting block 17 faces inward and towards the luminous unit 21. A front surface of the second limiting block 17b and a front surface of the supporting section 16 are flush.

The upper restricting block 15a and the lower restricting block 15b are rectangular. The upper restricting block 15a and the lower restricting block 15b are parallel to each other. The supporting section 16 is rectangular. The upper restricting block 15a and the lower restricting block 15b extend along the front-to-rear direction. The supporting section 16 extends between the upper restricting block 15a and the lower restricting block 15b along an up-down direction. An upper end and a lower end of the supporting section 16 are connected to two outer ends of the upper restricting block 15a and the lower restricting block 15b to form the U-shape structure seen from a front view. The upper buckling arm 24a is perpendicularly connected to the upper restricting block 15a. The lower buckling arm 24b is perpendicularly connected to the lower restricting block 15b.

Figure 9:
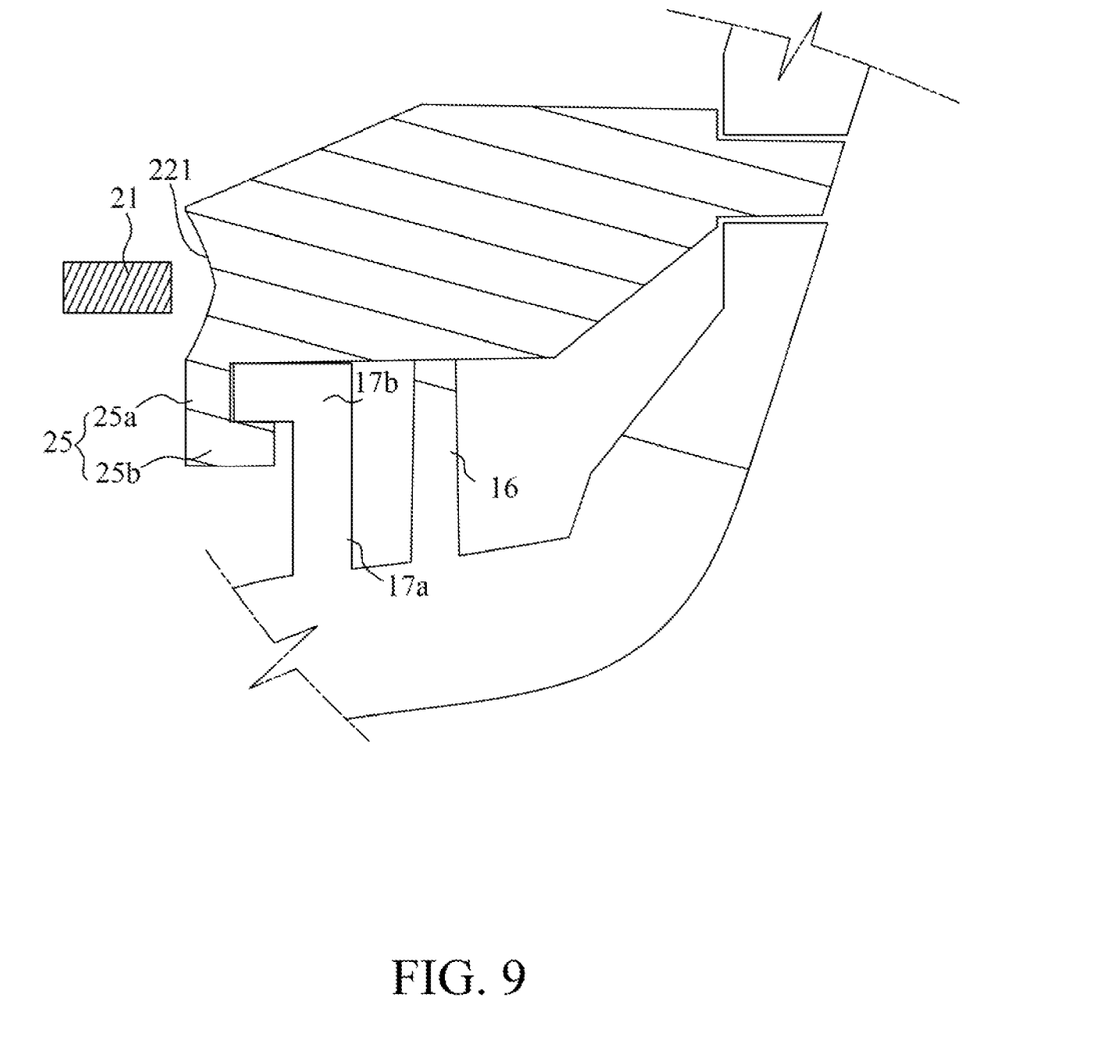
FIG. 9 is a sectional view of the light emitting device of the headphone of FIG. 1.

The supporting section 16 is perpendicular to the upper restricting block 15a and the lower restricting block 15b. The upper restricting block 15a and the lower restricting block 15b project beyond the front surface of the supporting section 16 along the front-to-rear direction. The limiting block 17 is mounted in the U-shape structure. The upper elastic arm 241a of the upper buckling arm 24a and the lower elastic arm 241b of the lower buckling arm 24b abut against two facing surfaces of the upper restricting block 15a and the lower restricting block 15b. The upper elastic arm 241a of the upper buckling arm 24a and the lower elastic arm 241b of the lower buckling arm 24b are fastened to the two facing surfaces of the upper restricting block 15a and the lower restricting block 15b, so that the light guiding unit 22 is disposed between the upper restricting block 15a and the lower restricting block 15b, and the light emitting device 20 is fastened in the housing 11. The upper hook 242a of the upper buckling arm 24a and the lower hook 242b of the lower buckling arm 24b hook two outer surfaces of the upper restricting block 15a and the lower restricting block 15b. The upper hook 242a of the upper buckling arm 24a and the lower hook 242b of the lower buckling arm 24b are fastened to two outer ends of the upper restricting block 15a and the lower restricting block 15b. Simultaneously, the second limiting block 17b is inserted into the limiting space 251 of the positioning wall 25, the second limiting block 17b is limited in the limiting space 251 of the positioning wall 25, and the second limiting block 17b is fastened in the limiting space 251 of the positioning wall 25 for fastening the light guiding unit 22 between the upper restricting block 15a and the lower restricting block 15b. The light guiding unit 22 is locked to the locking unit 102.

Referring to FIG. 1 to FIG. 9 again, before the light guiding unit 22 is assembled in the housing 11, the light guiding unit 22 is unlocked from the locking unit 102. When the light guiding unit 22 is assembled in the housing 11, steps of assembling the light guiding unit 22 in the housing 11 of the earcup 10 of the headphone 100 are described as follows. At first, make the upper hook 242a of the upper buckling arm 24a and the lower hook 242b of the lower buckling arm 24b abut against the two facing surfaces of the upper restricting block 15a and the lower restricting block 15b, so that the second reflecting surface 222b contacts with the front surface of the second limiting block 17b and the front surface of the supporting section 16. The second reflecting surface 222b abuts against the front surface of the second limiting block 17b and the front surface of the supporting section 16. The second reflecting surface 222b is supported by the front surface of the second limiting block 17b and the front surface of the supporting section 16.

Then push the light guiding unit 22 to move towards the opening 11a to make the second reflecting surface 222b slide outward, the second reflecting surface 222b pass through the front surface of the second limiting block 17b and the front surface of the supporting section 16, and make the upper hook 242a of the upper buckling arm 24a and the lower hook 242b of the lower buckling arm 24b pass through the two facing surfaces of the upper restricting block 15a and the lower restricting block 15b, so the upper hook 242a of the upper buckling arm 24a and the lower hook 242b of the lower buckling arm 24b hook the two outer surfaces of the upper restricting block 15a and the lower restricting block 15b.

At the moment, the upper elastic arm 241a of the upper buckling arm 24a and the lower elastic arm 241b of the lower buckling arm 24b expand towards the two facing surfaces of the upper restricting block 15a and the lower restricting block 15b on account of elastic functions of the upper elastic arm 241a and the lower elastic arm 241b, so the upper elastic arm 241a of the upper buckling arm 24a and the lower elastic arm 241b of the lower buckling arm 24b abut against the two facing surfaces of the upper restricting block 15a and the lower restricting block 15b, the upper hook 242a of the upper buckling arm 24a and the lower hook 242b of the lower buckling arm 24b are fastened to the two outer ends of the upper restricting block 15a and the lower restricting block 15b. The emitting surface 224 abuts against the inner surface of the housing 11. The emitting surface 224 of the light guiding unit 22 abuts against the inner surface of the periphery of the housing 11 to ensure that the light transmitting column 23 is inserted into the opening 11a, and the second limiting block 17b is limited in the limiting space 251 of the positioning wall 25, and the second limiting block 17b is fastened in the limiting space 251 of the positioning wall 25, so the light guiding unit 22 is assembled in the audio chamber 12, and the light guiding unit 22 is fastened in the audio chamber 12.

As described above, the light guiding unit 22 of the light emitting device 20 is disposed as the up-down symmetrical polyhedron, the incident surface 221, the emitting surface 224, the first refracting surface 223a, the first reflecting surface 222a, the second reflecting surface 222b and the second refracting surface 223b are all perpendicular to the central symmetry plane of the light guiding unit 22, and the light rays emitted by the luminous unit 21 are effectively guided to the outermost surface 231 of the light transmitting column 23 by virtue of the refracting actions of the first refracting surface 223a and the second refracting surface 223b, and the reflecting actions of the first reflecting surface 222a and the second reflecting surface 222b, so the light transmission rates of the light rays of the light guiding unit 22 are increased. Furthermore, the light guiding unit 22 has the upper buckling arm 24a, the lower buckling arm 24b and the positioning wall 25, the inside of the housing 11 includes the upper restricting block 15a fastened with the upper buckling arm 24a, the lower restricting block 15b fastened with the lower buckling arm 24b, and the limiting block 17 fastened in the positioning wall 25, so an assembly operator is able to assemble the light guiding unit 22 to the inside of the housing 11 without tools, an assembly cost of the headphone 100 is lowered, and working hours of the headphone 100 are shortened, in that case, a reworking performance of assembling the light guiding unit 22 in the inside of the housing 11 of the headphone 100 is improved. As a result, the light emitting device 20 improves a usage rate of a light source and simplifies an assembly process of the light emitting device 20.

What is claimed is:

1. A light emitting device, comprising:
   a luminous unit, light emitted by the luminous unit travelling along a light axis of the luminous unit; and
   a light guiding unit disposed close to the luminous unit, the light guiding unit having:
   an incident surface formed at an inner surface of an inner end of the light guiding unit, the incident surface being adjacent to the luminous unit, the incident surface facing the luminous unit;
   an emitting surface formed at an outer surface of an outer end of the light guiding unit, the emitting surface of the outer end of the light guiding unit and the incident surface of the inner end of the light guiding unit being opposite to each other, the incident surface being located between the luminous unit and the emitting surface;
   a first refracting surface disposed in the light axis, the first refracting surface being slantwise extended rearward and inward from a rear edge of the emitting surface;
   a first reflecting surface parallel to the light axis, and the first reflecting surface being connected to the emitting surface, the first reflecting surface being extended horizontally and extended inward from a front edge of the emitting surface;
   a second reflecting surface parallel to the light axis and connected to the first refracting surface, the second reflecting surface being extended inward from a rear edge of the first refracting surface, the second reflecting surface being parallel to the first reflecting surface, the second reflecting surface being located between the incident surface and the first refracting surface;
   a second refracting surface connected between the incident surface and the first reflecting surface, the second refracting surface being slantwise extended frontward and outward from a front of the incident surface, the second refracting surface being connected with the first reflecting surface; and
   a light transmitting column protruded outward from a middle of the emitting surface;
   wherein a middle of the inner surface of the inner end of the light guiding unit is recessed inward to form the incident surface, the incident surface is an optical cambered surface, the first reflecting surface and the second reflecting surface are longitudinally positioned at two opposite positions of the light guiding unit, the incident surface, the emitting surface, the first refracting surface, the first reflecting surface, the second reflecting surface and the second refracting surface are all perpendicular to a central symmetry plane of the light guiding unit, the central symmetry plane is defined by a transverse axis and a longitudinal axis, the transverse axis is parallel with the light axis, the longitudinal axis is parallel with the emitting surface.

2. The light emitting device as claimed in claim 1, wherein a periphery of a housing of a headphone defines an opening penetrating through an inner surface and an outer surface of the periphery of the housing, the light transmitting column is inserted in the opening, an outermost surface of the light transmitting column is smoothly connected with the outer surface of the periphery of the housing.

3. The light emitting device as claimed in claim 2, wherein an inside of the housing has an upper restricting block near to a top of the opening, a lower restricting block near to a bottom of the opening, a supporting section connected between the upper restricting block and the lower restricting block, and a limiting block surrounded among the upper restricting block, the lower restricting block and the supporting section.

4. The light emitting device as claimed in claim 3, wherein a rear of the inner end of the light guiding unit extends rearward and then extends outward to form a positioning wall, the incident surface is located in front of the positioning wall, the positioning wall is arranged at an inner end of the second reflecting surface, the positioning wall has a first positioning block extended rearward from the inner end of the second reflecting surface, and a second positioning block protruded outward from a tail end of the first positioning block, the first positioning block of the positioning wall is perpendicularly connected to the inner end of the second reflecting surface, the second positioning block extends towards an extending direction of the opening to make the positioning wall formed in a L shape, a front of an outer end of the positioning wall defines a limiting space between the first positioning block and the second positioning block, the limiting space faces outward and towards the extending direction of the opening, the limiting block has a first limiting block and a second limiting block, the first limiting block is protruded frontward from an inner surface of the housing, the second limiting block is perpendicular to the first limiting block, and the second limiting block extends inward and towards the luminous unit, the second limiting block is limited in the limiting space of the positioning wall.

5. The light emitting device as claimed in claim 4, wherein a front surface of the second limiting block and a front surface of the supporting section are flush, the second reflecting surface contacts with the front surface of the second limiting block and the front surface of the supporting section, the second reflecting surface is supported by the front surface of the second limiting block and the front surface of the supporting section.

6. The light emitting device as claimed in claim 3, wherein the supporting section is rectangular, the upper restricting block and the lower restricting block extend along a front-to-rear direction, the supporting section is perpendicular to the upper restricting block and the lower restricting block, the upper restricting block and the lower restricting block project beyond a front surface of the supporting section along the front-to-rear direction, an upper end and a lower end of the supporting section are connected to two outer ends of the upper restricting block and the lower restricting block to form a U-shape structure, the limiting block is mounted in the U-shape structure.

7. The light emitting device as claimed in claim 3, wherein the light guiding unit has a base portion, an upper buckling arm and a lower buckling arm, the upper buckling arm has an upper elastic arm and an upper hook, the lower buckling arm has a lower elastic arm and a lower hook, an upper surface and a lower surface of an inner end of the base portion protrude oppositely and extend outward to form the upper elastic arm and the lower elastic arm, a top of a tail end of the upper elastic arm protrudes upward to form the upper hook, a bottom of a tail end of the lower elastic arm protrudes downward to form the lower hook, the upper elastic arm of the upper buckling arm and the lower elastic arm of the lower buckling arm abut against two facing surfaces of the upper restricting block and the lower restricting block, the upper hook of the upper buckling arm and the lower hook of the lower buckling arm hook two outer surfaces of the upper restricting block and the lower restricting block, the base portion has the incident surface, the emitting surface, the first refracting surface, the first reflecting surface, the second reflecting surface and the second refracting surface.

8. The light emitting device as claimed in claim 1, wherein the first refracting surface is intersected with an extension line of the second reflecting surface, so an angle is formed between the first refracting surface and the extension line of the second reflecting surface, the angle which is formed between the first refracting surface and the extension line of the second reflecting surface is ranged from more than thirty-seven degrees to less than forty degrees.

9. The light emitting device as claimed in claim 1, wherein the second refracting surface is intersected with an extension line of the first reflecting surface, so an angle is formed between the second refracting surface and the extension line of the first reflecting surface, the angle which is formed between the second refracting surface and the extension line of the first reflecting surface is ranged from more than twenty-five degrees to less than twenty-eight degrees.

10. The light emitting device as claimed in claim 1, wherein the light guiding unit and the light transmitting column are integrally formed, the light guiding unit and the light transmitting column are made of a polycarbonate material into which light diffusing agents and titanium dioxides are added.

11. A light emitting device, comprising:
a luminous unit defining a light axis; and
a light guiding unit disposed close to the luminous unit, the light guiding unit having:
    a base portion, the base portion having:
        an incident surface positioned at one end of the light axis;
        a first refracting surface positioned at the other end of the light axis, the incident surface being positioned between the luminous unit and the first refracting surface;
        an emitting surface connected with the first refracting surface;
        a second refracting surface connected with one side of the incident surface;
        a first reflecting surface interconnected with the emitting surface and the second refracting surface; and
        a second reflecting surface connected with the other side of the incident surface, the second reflecting surface being interconnected with the incident surface and the first refracting surface;

a light transmitting column protruded outward from a middle of the emitting surface;

a positioning wall extended from the second reflecting surface of the base portion; and a pair of buckling arms extended from two opposite surfaces of the base portion, the two opposite surfaces of the base portion being two surfaces of the base portion excluding the incident surface, the first refracting surface, the emitting surface, the second refracting surface, the first reflecting surface and the second reflecting surface, each buckling arm being a cantilever.

12. A headphone, comprising:

a housing having:

an opening penetrating through a periphery of the housing;

a pair of restricting blocks being positioned at an inside of the housing and being near to the opening;

a supporting section connected between the pair of the restricting blocks; and a limiting block surrounded among the pair of the restricting blocks and the supporting section;

a printed circuit board mounted in the housing; and a light emitting device mounted in the housing, having:

a luminous unit defining a light axis; and a light guiding unit disposed close to the luminous unit, the light guiding unit having:

a base portion, the base portion having:

an incident surface positioned at one end of the light axis;

a first refracting surface positioned at the other end of the light axis, the incident surface being positioned between the luminous unit and the first refracting surface;

an emitting surface connected with the first refracting surface;

a second refracting surface connected with one side of the incident surface;

a first reflecting surface interconnected with the emitting surface and the second refracting surface;

a second reflecting surface connected with the other side of the incident surface, the second reflecting surface being interconnected with the incident surface and the first refracting surface;

a light transmitting column protruded from the emitting surface;

a positioning wall being extended from the second reflecting surface of the base portion; and a pair of buckling arms extended from two opposite surfaces of the base portion, the two opposite surfaces being two surfaces of the base portion excluding the incident surface, the first refracting surface, the emitting surface, the second refracting surface, the first reflecting surface and the second reflecting surface, each buckling arm being a cantilever;

wherein the second reflecting surface is connected with the limiting block and the supporting section, the light transmitting column is inserted in the opening, the positioning wall is engaged with the limiting block, the pair of the buckling arms are engaged with the pair of the restricting blocks, the luminous unit is mounted on the printed circuit board, the base portion is positioned between the pair of the buckling arms.

13. The headphone as claimed in claim 12, wherein the positioning wall has a first positioning block and a second positioning block, the first positioning block is extended from the second reflecting surface, the second positioning block is protruded outward from a tail end of the first positioning block, the first positioning block of the positioning wall is perpendicularly connected to the second reflecting surface, the second positioning block extends towards the opening to make the positioning wall formed in a L shape, a limiting space is defined between the first positioning block and the second positioning block, the limiting space faces outward and towards the opening, the limiting block has a first limiting block and a second limiting block, the first limiting block is protruded from an inner surface of the housing, the second limiting block is perpendicular to the first limiting block, and the second limiting block extends inward and towards the luminous unit, the second limiting block is limited in the limiting space of the positioning wall.

14. The headphone as claimed in claim 13, wherein a front surface of the second limiting block and a front surface of the supporting section are flush, the second reflecting surface contacts with the front surface of the second limiting block and the front surface of the supporting section.

15. The headphone as claimed in claim 14, wherein the supporting section is rectangular, the pair of the restricting blocks are rectangular, the pair of the restricting blocks extend along an inside-to-outside direction, the opening is extended along the inside-to-outside direction, the supporting section is perpendicular to the pair of the restricting blocks, two opposite ends of the supporting section are connected to two outer ends of the pair of the restricting blocks to form a U-shape structure, the limiting block is mounted in the U-shape structure.

16. The headphone as claimed in claim 15, wherein the pair of the buckling arms have two elastic arms and two hooks, two inner ends of the two opposite surfaces of the base portion protrude oppositely and extend outward to form the two elastic arms, tail ends of the two elastic arms protrude towards the pair of the restricting blocks to form the two hooks, the two elastic arms of the pair of the buckling arms abut against two facing surfaces of the pair of the restricting blocks, the hooks of the pair of the buckling arms hook two outer surfaces of the pair of the restricting blocks.

17. The headphone as claimed in claim 12, wherein the first refracting surface is intersected with an extension line of the second reflecting surface, so an angle is formed between the first refracting surface and the extension line of the second reflecting surface, the angle which is formed between the first refracting surface and the extension line of the second reflecting surface is ranged from more than thirty-seven degrees to less than forty degrees.

18. The headphone as claimed in claim 12, wherein the second refracting surface is intersected with an extension line of the first reflecting surface, so an angle is formed between the second refracting surface and the extension line of the first reflecting surface, the angle which is formed between the second refracting surface and the extension line of the first reflecting surface is ranged from more than twenty-five degrees to less than twenty-eight degrees.

19. The headphone as claimed in claim 12, wherein the light guiding unit and the light transmitting column are integrally formed, the light guiding unit and the light transmitting column are made of a polycarbonate material into which light diffusing agents and titanium dioxides are added.

\* \* \* \* \*